(12) United States Patent
Isaac

(10) Patent No.: US 8,296,185 B2
(45) Date of Patent: Oct. 23, 2012

(54) NON-INTRUSIVE MEDIA LINKED AND EMBEDDED INFORMATION DELIVERY

(75) Inventor: Timothy Reynard Isaac, Brea, CA (US)

(73) Assignee: Bitesize Media, Inc.

( * ) Notice: Subject to any disclaimer, the term of this patent is extended or adjusted under 35 U.S.C. 154(b) by 455 days.

(21) Appl. No.: 12/608,912

(22) Filed: Oct. 29, 2009

(65) Prior Publication Data

US 2010/0274673 A1    Oct. 28, 2010

Related U.S. Application Data

(60) Provisional application No. 61/198,043, filed on Nov. 1, 2008.

(51) Int. Cl.
*G06Q 30/00*     (2006.01)
*H04N 7/173*     (2006.01)

(52) U.S. Cl. ............... 705/14.55; 705/14.56; 705/14.73; 725/109

(58) Field of Classification Search ............... 705/14.55, 705/14.56, 14.73; 725/109
See application file for complete search history.

(56) References Cited

U.S. PATENT DOCUMENTS

| | | | |
|---|---|---|---|
| 6,633,850 B1 | 10/2003 | Gabbard et al. | |
| 6,804,659 B1 | 10/2004 | Graham et al. | |
| 7,269,837 B1 | 9/2007 | Redling et al. | |
| 7,337,457 B2* | 2/2008 | Pack et al. | ........................ 725/40 |
| 7,461,338 B2 | 12/2008 | Landau et al. | |
| 2001/0056463 A1* | 12/2001 | Grady et al. | ................... 709/203 |
| 2002/0080163 A1* | 6/2002 | Morey | ........................... 345/727 |
| 2002/0095332 A1 | 7/2002 | Doherty et al. | |
| 2003/0074671 A1* | 4/2003 | Murakami et al. | ............ 725/109 |
| 2003/0149621 A1 | 8/2003 | Shteyn | |
| 2004/0006509 A1* | 1/2004 | Mannik et al. | ................... 705/14 |
| 2004/0015398 A1 | 1/2004 | Hayward | |
| 2005/0267809 A1* | 12/2005 | Zheng | ............................. 705/14 |
| 2006/0136305 A1 | 6/2006 | Fitzsimmons et al. | |
| 2006/0150212 A1 | 7/2006 | Magnussen et al. | |
| 2007/0130335 A1 | 6/2007 | Loher | |
| 2008/0281685 A1 | 11/2008 | Jaffe et al. | |
| 2008/0281689 A1 | 11/2008 | Blinnikka et al. | |
| 2009/0150210 A1 | 6/2009 | Athsani et al. | |
| 2009/0199236 A1 | 8/2009 | Barrett et al. | |
| 2009/0228921 A1* | 9/2009 | Miki et al. | ...................... 725/38 |
| 2010/0274673 A1* | 10/2010 | Isaac | .......................... 705/14.73 |

OTHER PUBLICATIONS

Advertising Digital Identification, LLC. Ad-ID Structure. Sep. 21, 2009. <https://www.ad-id.org/help/structure.cfm> 3 pages.
Clickthrough.com. Copyright Autopilot Internet Ltd. Dec. 15, 2009. <http://clickthrough.com> 1 page.
FastCompany.com. Mansueto Ventures, LLC. Copyright 2009. Dec. 15, 2009. <http://www.fastcompany.com/tag/compulsiontv> 1 page.
SeenOn! The Official Destination for Products Seen on Television and Celebrities. Delivery Agent, Inc. Copyright 2009. Dec. 15, 2009. <http://www.seenon.com/> 3 pages.

\* cited by examiner

*Primary Examiner* — Donald L. Champagne
(74) *Attorney, Agent, or Firm* — Stetina Brunda Garred & Brucker

(57) ABSTRACT

A method for information delivery is disclosed. The method includes directing the display of a multimedia presentation in a first screen segment. The multimedia presentation is associated with a reference tag descriptive of an aspect thereof. An information link corresponding to the reference tag in a second screen segment is generated. The information link is contextually related to the multimedia presentation in accordance with the reference tag. Thereafter, a selection input of the information link is received from one of the viewers while mitigating obstruction of the displaying of the multimedia presentation. The selected information link and the identity of the viewer are associated as a marker.

17 Claims, 6 Drawing Sheets

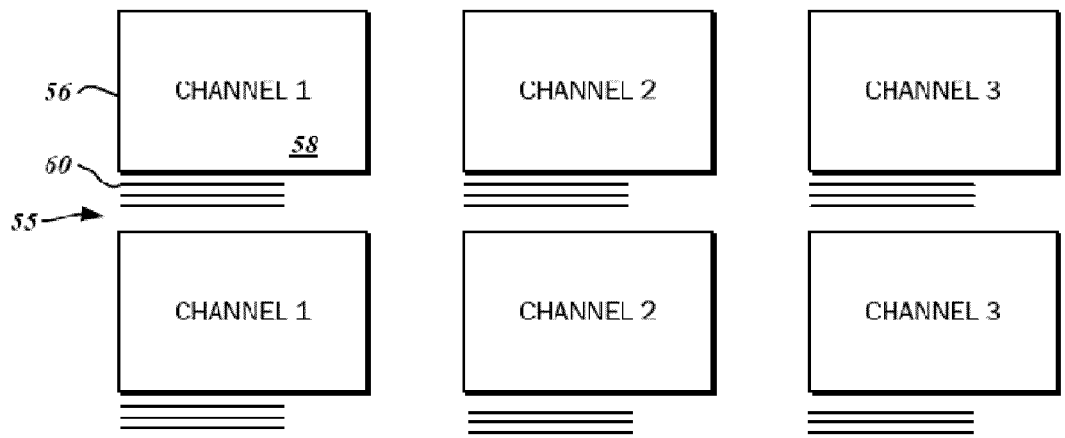

NON-INTRUSIVE MEDIA LINKED AND EMBEDDED INFORMATION DELIVERY

CROSS-REFERENCE TO RELATED APPLICATIONS

This application relates to and claims the benefit of U.S. Provisional Application No. 61/198,043 filed Nov. 1, 2008, the entire contents of which is expressly incorporated by reference herein.

STATEMENT RE: FEDERALLY SPONSORED RESEARCH/DEVELOPMENT

Not Applicable

BACKGROUND

1. Technical Field

The present disclosure relates generally to the delivery of content and context-sensitive advertisements, and more particularly to methods and systems for non-intrusive, media linked and embedded information delivery.

2. Related Art

Advertising generally refers to communications directed to sell products and services, or otherwise influence its recipients' behavior. To maximize exposure, wide-reaching, "traditional" media outlets such as print, radio, and television have been utilized to carry advertisements. These traditional forms of communication, particularly radio and television, capture the attention of the listener or viewer by presenting entertainment or informational content and interrupting that presentation at regular intervals to air commercial messages with the anticipation that the listener or viewer will remain fixated until the next segment. As a substitute for or as a supplement to conventional interruptive commercials, various advertisers' products are sometimes prominently placed in the presentation.

From early on in the history of broadcasting, advertising and content production have been intertwined, as broadcasters depended upon the revenue generated from the advertisements to subsidize production, and the advertisers depended on quality production to attract more viewers for increased sales. Listeners and viewers have benefited from this dynamic, as high-quality radio and television programming can be obtained for free. However, the listener or viewer largely remains a passive recipient of advertising and content, having little control over the same, perhaps except for changing channels and to turning the receiver on or off.

With increased computing power and network bandwidth, the global Internet is becoming a popular modality for delivering information and entertainment content. Typical consumer-oriented computer systems are capable of connecting to the Internet via cable, digital subscriber line (DSL), satellite, or telephone services, and have a web browser application installed thereon. With the indicated Uniform Resource Locator (URL) address, the web browser application communicated with the specified server to retrieve the specified document for display. Although the World Wide Web (the Web) was originally conceived for text-based data exchange, with feature advancements and external plug-in modules, a wide variety of multimedia content including video, audio, and images can be presented via the web browser application. Accordingly, consumers are no longer restricted to the aforementioned traditional media, and are regularly engaged with a combination of video, audio and text content over the Web.

The interactivity of the Web has not only appealed to consumers, but to advertisers as well, particularly because recipients essentially arrive at a website pre-selected for a specific commercial message. That is, the advertising can be targeted to a more precise degree because it was the consumer's interest in the subject matter of the website that resulted in a visit in the first place, in contrast to the more general approach associated with traditional media. One well-known advertisement system is Google AdSense, which incorporates advertisements on to a search engine results page based upon the user's search query.

Another common advertisement methodology involves the placement of banner advertisements on various parts of web pages interspersed with content. The banner advertisements include some combination of text and images, and is hyperlinked to the advertiser's own website where additional information is provided, or the advertised product or service can be purchased. Such banner advertisements may be made more intrusive by rendering them as pop-up advertisements, which are separate, smaller windows containing advertising that are overlaid on an existing window. Because the user must select a proximally located window control element to close it, the user is essentially forced to view the advertisement.

As noted above, the Internet is being increasingly utilized for delivering multimedia content such as videos and music. In order to support and fund video sharing sites, conventional context-sensitive advertising and banner advertisements may be employed. In some cases, the multimedia content is played back in a separate window of a dedicated playback software application. In other cases, the interface of the playback software application, including a portion where the multimedia content is replayed, is incorporated into the layout of an underlying webpage (e.g., YouTube). The sections of the webpage surrounding the playback interface typically incorporate advertisements that may or may not be contextually related to the multimedia content.

As is typically the case with all online advertisements, these banner advertisements are frequently ignored or overlooked at best, and at worst, the browser applications prevent them from being displayed in the first instance. Some measure of success has been achieved with these conventional online advertisement systems, however, as many websites generate substantial revenue therewith.

While acknowledging its limited successes, there still are numerous deficiencies associated with conventional online advertising approaches. One theory known in the art is attention economics, which proposes that the increased availability of information corresponds to a scarcity of attention with respect to the recipients of the information, that is, human attention is treated as a scarce commodity. Disregarding this, many advertisement modalities have been developed that attempt to gain more of the user's attention, while resulting in the attendant negative externalities or "noise" that burdens the user. The heavy emphasis on gaining the user's initial interest lies in the traditionally accepted advertising paradigm of Attention, Interest, Desire, and Action (AIDA) that posits the "Attention" step as being the most critical, thus promoting the invasion of space.

In addition to those already mentioned, there are a variety of implementations of online advertising in connection with multimedia content delivery that follow the above-described paradigm. For example, the Compulsion.tv website that employed an interface in which each product placed into the video presentation was a clickable hyperlink therefor. Another example is the SeenOn.com website that includes a media player with product placement hotspotting, and a listing of all available items in the video presentation. Along these lines, the YouTube.com website employs a semi-transparent overlay that informs the user about product purchase opportunities that are related to the video presentations.

Some websites take even greater control over the delivery and presentation of multimedia content, forcing the user to view a short advertisement before starting playback. In some cases, the presentation is interrupted, again forcing the user to view another short advertisement. This is essentially reversion to traditional television broadcasting and advertisement, where the content producer and/or the broadcaster strictly controlled the presentation of advertisement and content. Significant consumer backlash may accompany such approaches, in that the associated brand may be perceived as being annoying, and related products may be deemed undesirable. Even in broadcast media where this approach has been accepted, tolerance for these tactics is decreasing, as manifested in the increasing popularity of Digital Video Recorders (DVRs) and Video-On-Demand (VOD) services that allow commercial messages to be skipped or omitted entirely.

The traditional advertising model places a lot of importance on the advertiser rather than the user, as the advertiser had the power to determine when, where or how the advertisements would appear. Along these lines, content producers with the largest appeal or the most hits on the website attracted the most advertising dollars because the large appeal assures the most exposure for the money. As such, smaller advertisers can be precluded from advertising with large and popular media outlets even if the product being sold was a good fit for the audience. At the same time, smaller, lesser-known content producers that may have a narrower appeal can be precluded from entering into a substantial advertising agreement due to the perceived lack of an audience. The lack of funding may further result in production cancellations.

Due to the aforementioned deficiencies and more, there is a need in the art and for a more user-centric approach to advertising, specifically, non-intrusive media linked and embedded advertising.

BRIEF SUMMARY

The present disclosure broadly contemplates an environment that brings together content providers, advertisers, and users to create synergistic relationships of mutual benefit. Content providers can maintain creative integrity while attracting significant advertisers. Advertisers can effectively reach relevant target audiences, and positively influence brand awareness. Users can enjoy uninterrupted media presentations while having more control over selecting information pertaining to products or services referenced or associated with the media presentation.

The present disclosure contemplates linking product data and other data or metadata contextually relevant to the media presentation. This process may be characterized as creating a "hypermedia" which may be defined as a logical extension of the term hypetext in which graphics, audio, video, plain text and hyperlinks intertwine to create a generally non-linear medium of information. By way of example and not limitation, information links provide interactive, non-linear information attributes to a linear medium. More particularly, since a media presentation starts at a point and ends at another point without deviation (e.g. "you go to a movie and sit there until it is over") without deviating from the story being told (i.e. "a straight line"). The information links provide deviation points to the movie while mitigating interruption of the movie so viewers can later jump off of the straight line of the plot, and into other aspects of the movie that are not available in a purely linear approach of viewing the movie.

The methods and systems disclosed herein are designed to permit vast elements of a media presentation to be exposed or distilled to a more refined level. Through exemplary human-computer interfaces, the various aspects disclosed herein allows underlying or additional information to be unobtrusively introduced into a media presentation experience. One of the purposes of introducing the additional or underlying information is to convert the originally intended media presentation experience (e.g., watching a television program, etc.) into other useful media presentation experiences (e.g., shopping for products or services related to the media presentation, learning about characters of the television program, etc.).

The various aspects disclosed herein does not only provide another way of selling products to would-be customers, but also provides a method of more efficiently transferring useful information of all kinds to viewers of a media presentation.

The media presentation may be "morphed" into an educational tool, retail sales tool, research tool, or entertainment embellishment tool. The morphing of the media presentation may be accomplished without producing more content; thus providing a cost savings while simultaneously expanding its uses. This is accomplished by providing information links (e.g., product information, character information, acting techniques, etc.) based on the content of the media presentation that can be clicked and lead the viewer to additional information either at the time the link is clicked or after viewing of the media presentation.

The present disclosure permits the unobtrusive transmission of information, allows transmitted information to be extracted, allows transmitted information to be retained for later retrieval and interaction, and allow a media presentation to transform itself from a single purpose (e.g., viewing by viewers) to a multipurpose asset (e.g., learning tool, etc.) without possibly having to incur costs for re-producing the same presentation to support multiple uses. This combination of features can benefit a media presentation and the production company that developed it, and because of forethought towards the end-user experience reciprocal benefits are awarded to the viewers of the media presentation through the automated information retention and retrieval mechanisms. These end-user features cut against the grain of what is usually presented to an end-user when other similar systems are employed as those other systems do not include the step of automatically storing end-user selected information. Producers typically want to engage in interruption type advertising. This feature of automatically storing end-user selected data has multiple benefits for an end-user. Some of which are reducing the chances of them losing track of what they have deemed interesting, allowing an end-user to receive updated information concerning the subject matter they selected because updates can be delivered to their a specialized personal information collection, rather than sent via email systems where desired information may be re-routed by SPAM filters and other email security measures, and allowing an end-user to access their information collection from an Internet connected resource. The end-user also controls his/her viewing experience and interaction with the media presentation. The end-user dictates when the stored links will be viewed either during viewing of the media presentation or after the media presentation is over. The aforementioned end-user capabilities facilitate a symbiotic-like environment between media content and it's viewer.

As well, the various aspects disclosed herein may also be helpful in letting productions of all kinds make better use of the unwanted parts of the presentation; meaning that in post-production editing processes, the pieces of a presentation that did not make the cut, may still provide some useful educational, retail, entertainment, or research value when the invention is applied to the those unwanted pieces. Further, the various aspects disclosed herein may allow the users to toggle between information link types (i.e. educational, retail, entertainment, research, etc.) as they engage a media presentation or they can choose to show all of the link types that have been applied to a media presentation that uses this invention. The congruity of the parts of the invention operating as a system; meaning it's organization of interfaces, functionality, and versatility must itself count as a unique feature, considering that such congruity is difficult to achieve. The toggling may be by way of example and not limitation, keyboard stroke, remote control buttons, mouse clicks, minimizing, etc.

Further, by way of example and not limitation, implementing the various aspects disclosed herein to the television show "Friends", the "Friends" media presentation could take on an educational aspect by unobtrusively introducing information links associated to such things as acting techniques used on the show, lighting techniques, comedy writing techniques, set design tips, etc. expressly tied to the contextual elements occurring at the moment they appear or are heard. Because the information links occur or are presented for viewing while a viewer is engaged with the media presentation in synchrony with the media presentation and are saved when selected, the various method and systems disclosed herein do not rely on a viewer remembering what occurred in a media presentation which would create a disconnection to some degree. A viewer is allowed to extract and retain information that is directly associated to their current experience with the media presentation as well as access their selected information at anytime. One could say that a tether is created between the media presentation and the viewer with the tether being traceable and measurable.

A usage, by way of example and not limitation, of the methods and systems disclosed herein as a retail sales tool to the media presentation (e.g., Friends TV show), helps to transform everything on the set into a product placement. Again for clarity, the methods and system disclosed herein is designed to refine a media presentation from a macro-level down to a micro-level. This could allow product placements to fit more naturally into a scene, yet still attain notoriety, thus helping to maintain the artistic integrity of a media presentation while still providing monetary opportunities. And because the placements can be immediately extracted by viewers of the media presentation; brand advertisers attain actual qualified leads that are traceable and measurable. Since a qualified lead can be defined as "A potential customer who has expressed interest in a product or service and meets general buying criteria.", this invention can render a media presentation into a heavy hitting retail outlet for brand advertisers which could help production companies offset production costs through revenue sharing or additional placement fees or both and help brand advertisers sell more products.

In accordance with one embodiment, a method for delivering information to viewers of a multimedia presentation is contemplated. The method may include a step of directing the display of the multimedia presentation in a first screen segment. The multimedia presentation may be associated with a reference tag descriptive of an aspect of the multimedia presentation. Additionally, the method may include a step of generating an information link corresponding to the reference tag in a second screen segment. The information link may be contextually related to the multimedia presentation in accordance with the reference tag. The method may further include receiving a selection input of the information link from one of the viewers while the displaying of the multimedia presentation is ongoing. There may also be a step of associating the selected information link to an identity of the one of the viewers, the associating step may result in a first marker.

According to another embodiment, there is a method for bridging information presentation from a first medium to a second medium. The method may include receiving an informational identifier from a client. The informational identifier may be viewable on the first medium, and may include a first relational element, a separator, and a second relational element, each of which are comprised of alphanumeric characters and symbols. The method may include a step of querying a database of informational identifiers that are correlated to informational content on the second medium. The querying may be for the received information identifier. Additionally, the method may include redirecting the client to informational content that corresponds to the first and second relational elements of the received information identifier.

According to another embodiment, a computer readable medium tangibly embodying one or more programs of instructions executable by the computer to perform a method for delivering information to viewers of a multimedia presentation is disclosed. The method comprises the steps of directing the display of the multimedia presentation in a first screen segment, the multimedia presentation being associated with a reference tag descriptive of an aspect thereof; generating in a second screen segment an information link corresponding to the reference tag, the information link being contextually related to the multimedia presentation in accordance with the reference tag; receiving a selection input of the information link from one of the viewers while the displaying of the multimedia presentation is ongoing; and associating the selected information link to an identity of the one of the viewers as a marker.

According to another embodiment, a method for delivering context-sensitive advertisements to a client system in connection with a multimedia presentation is disclosed. The method comprises the steps of directing the playback of the multimedia presentation on the client system, the multimedia presentation being associated with a reference tag descriptive of an aspect thereof; receiving from the client system a selection input of an information link corresponding to the reference tag of the multimedia presentation; and storing the selected information link into a database in conjunction with an identifier of the client system.

The method may further comprise transmitting the selected information link and other information links stored in the database associated with the identifier of the client system.

In the method, prior to directing the playback of the multimedia presentation, the method may include the steps of associating the reference tag with a particular segment of the multimedia presentation corresponding to an aspect thereof.

In the method, the reference tag may be stored in association with the multimedia presentation.

In the method, the reference tag may be stored in conjunction with an identifier of the particular segment of the multimedia presentation.

BRIEF DESCRIPTION OF THE DRAWINGS

These and other features and advantages of the various embodiments disclosed herein will be better understood with respect to the following description and drawings, in which:

FIG. 4 is an exemplary content aggregation website with an arrangement of selectable content channels;

FIG. 5 is a login page for the content aggregation website;

FIG. 6 is an account setup page for the content aggregation website;

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one entity from another without necessarily requiring or implying any actual such relationship or order between such entities.

Various embodiments set forth in the present disclosure facilitates, via a single action, the denotation of user interest with a one or more particular sets of information and meta-information that can be associated with media content. The denotation can be accomplished while mitigating interruption, disturbance, or obscuring the user's viewing experience. By way of example and not limitation, a user may watch a media player over the internet. During the multimedia presentation, the user may denote particular object information (e.g., product, audio, locations, etc.) displayed within the media player for later or immediate retrieval. As such, the denotation does not interrupt the user's viewing experience of the primary multimedia presentation unless desired by the user. It is contemplated that the user may selectively stop the multimedia presentation to refer to a list of denoted objects which the user identified during the multimedia presentation. It is the user that controls the user's viewing experience.

Figure 1:
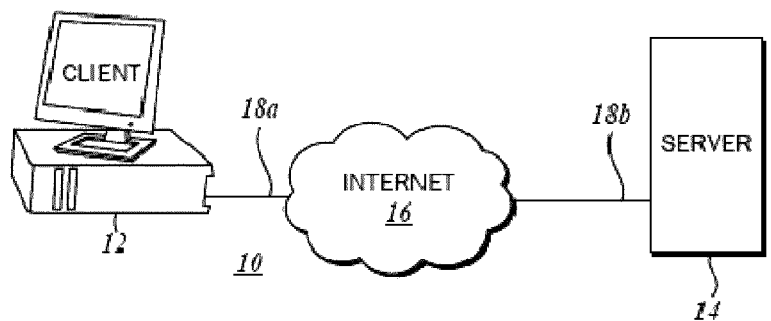
FIG. 1 is a block diagram of an exemplary networked computing environment within which various embodiments of the present disclosure may be implemented.

In accordance with various embodiments, a method for delivering information (e.g., advertisements, educational information, etc.) to viewers of a multimedia presentation is contemplated. FIG. 1 illustrates an exemplary setting in which the method may be implemented, i.e., a networked computing environment 10 including a client computer system 12 and server computer system 14 linked by the Internet 16 via network connections 18a, 18b. In the context of the exemplary networked computing environment 10, the term "client" is understood to refer to the role of the client computer system 12 as a requestor of data or services, while the term "server" is understood to refer to the role of the server computer system 14 to provide such requested data or services. It is possible that the components of the server computer system 14 may request data or services in one transaction, and provide data or services in a different transaction. It will be appreciated by those having ordinary skill in the art that the illustrated networked computing environment 10 is highly generalized, and that there are numerous variations with respect to implementation specificities that have not been set forth in the present disclosure.

The client computer system 12, which is presented by way of example only, may be a conventional desktop computer having a central processing unit, memory, and input and output devices connected thereto such as keyboards, mice, and display units. Again, there are numerous possible variations with regard to the hardware devices that comprise the client computer system 12 and the modalities by which it connects to the Internet 16, but which are not set forth in the present disclosure. Alternatives to the desktop computer include mobile devices such as smart phones, laptop computers, and the like.

The client computer system 12 is understood to have software instructions loaded thereon that, when executed, perform various functions in accordance with the various embodiments. One software component of the client computer system 12 is an operating system that manages and coordinates the operation of the various hardware components of the same. Furthermore, the operating system may provide a graphical user interface (GUI) that allows a user to interact intuitively with the client computer system 12. Common operating systems include, for example, Microsoft Windows, Apple Mac OS X, Linux, and so forth.

Figure 2:
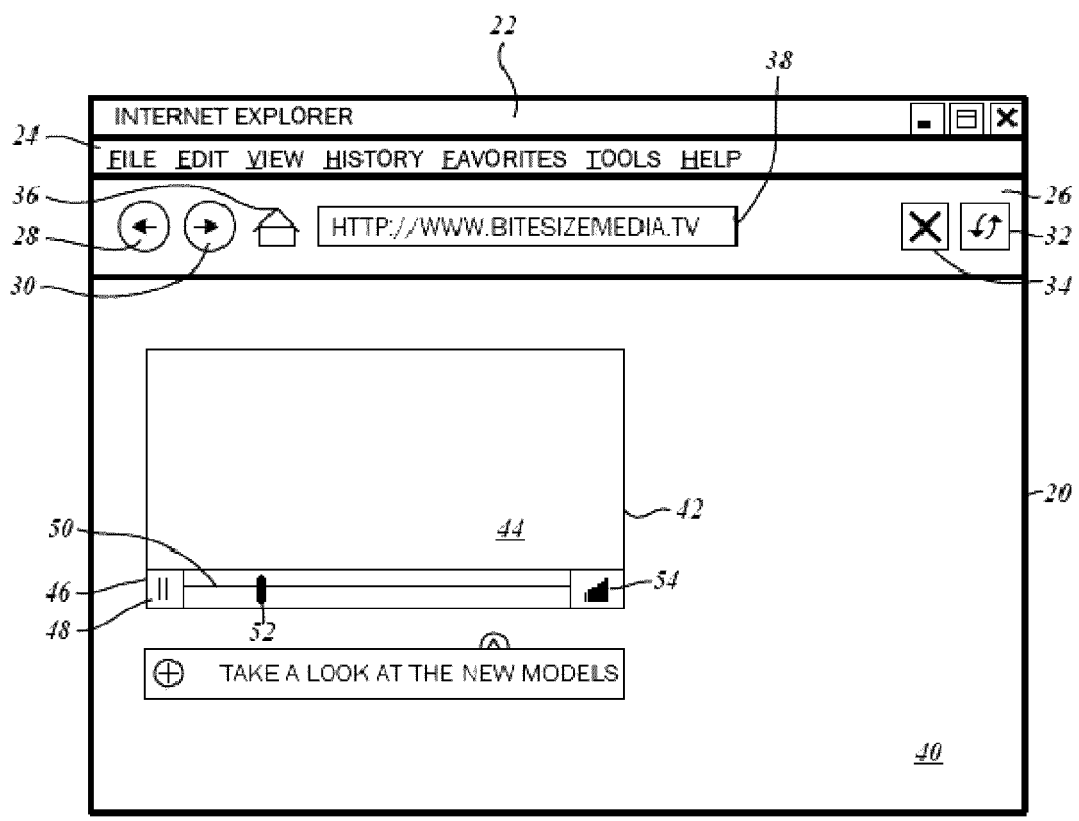
FIG. 2 is an exemplary interface of a web browser application including a plug-in interface and an information display unit.

Various application software may be installed on the client computer system 12, including, but not limited to, a web browser application, an exemplary user interface 20 thereof being illustrated in FIG. 2. By way of example only and not of limitation, the web browser application is Internet Explorer from Microsoft Corporation of Redmond, Washington, though others such as Firefox from the Mozilla Foundation may be readily substituted. As noted above, the client computer system 12 may be any one of a variety of computing devices, and it is understood that such computing devices have specialized web browser applications that function in essentially the same way.

The web browser application is understood to establish a network connection through the Internet 16 to the server computer system 14 over the HyperText Transfer Protocol (HTTP) or other protocol. In this regard, the server computer system 14 is understood to be a web server capable of responding to specific requests for data stored thereon. The server computer system 14 is also understood to incorporate other services such as the streaming of multimedia content, data store and retrieval, and the like. As referenced herein, the server computer system 14 is intended to incorporate all such services. The address of the server computer system 14 is specified in a Uniform Resource Locator (URL), also more accurately referred to as a Uniform Resource Identifier (URI), which the web browser application uses to locate the server computer system 14. In further detail, the web browser application issues a request for one or more web pages, with the particular file(s) and path(s) being identified by the URL. The server computer system 14 responds to this request and transmits the requested web page through the Internet 16 and back to the client computer system 12. The received web page is then rendered by the web browser application for viewing by the user.

The interface 20 of the web browser application is displayed on a display device connected to the client computer system 12. As dictated by the common graphical user interface of the operating system, the browser interface 20 typically includes a title bar 22, and a menu bar 24. Furthermore, the browser interface 20 includes a tool bar 26 with a back navigation icon 28, a forward navigation icon 30, a reload icon 32, a cancel icon 34, and a home page icon 36, the functions of which in relation to web browsing will be readily recognized by those having ordinary skill in the art. The URL of the web page to be requested is specified in a location bar 38. Once retrieved, the web page is rendered in a browser window 40.

As noted previously, the web page may include text, graphics, audio, video, browser-executable scripts and compiled modules, all of which are rendered within the interface 20 of the web browser application. It is understood that the certain multimedia files such as video, audio, animations and the like are not natively rendered by the web browser application. Instead, external helper applications known in the art as browser plug-ins, controls, extensions, add-ins, and so forth are called on-demand to display multimedia content. Common browser plug-ins include QuickTime from Apple Corporation, RealPlayer from RealNetworks, Inc., and Shockwave Flash from Adobe Systems, Inc, and each plug-in is typically able to handle media of a variety of presentation formats.

These browser plug-ins have associated interfaces that are embedded in the browser window 40, rendered in-line with the other content of the web page. Although each plug-in has a slightly different interface, like the different web browser applications, there are many common elements. FIG. 2 additionally illustrates an exemplary plug-in interface 42 for a video playback plug-in. The interface 42 is primarily comprised of a playback window 44 that displays the video content. Below the playback window 44 is a control toolbar 46 that includes a pause/play icon 48, which is operative to start and stop the playback of the video content. There is also a scrubber bar 50 that graphically represents playback progress based upon the relative position of a player head indicator 52. The player head indicator 52 can be moved to different positions along the scrubber 50 to jump to that particular location of the video. Additionally, the plug-in interface 42 includes a volume control icon 54 that adjusts the volume of the output audio. The particulars of the plug-in interface are presented by way of example only, and it will be appreciated that some embodiments may include additional interface elements that provide further control refinements than are shown herein. Conversely, the plug-in interface 42 may be simplified by reducing the interface elements.

Figure 3:
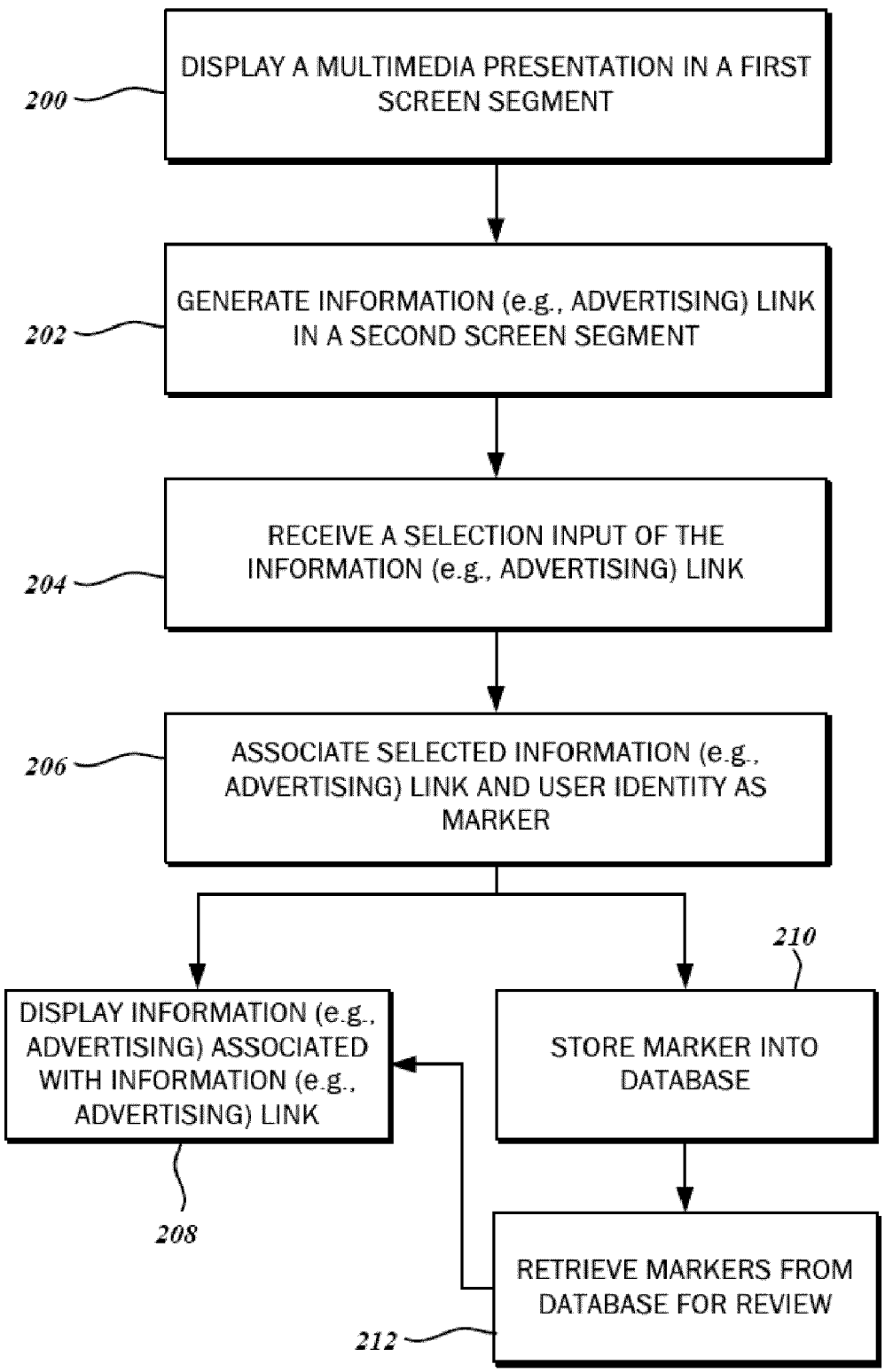
FIG. 3 is a flowchart illustrating a method for delivering information in accordance with one embodiment of the present disclosure.

Having considered in further detail the basic components of the exemplary networked computing environment 10, the method of delivering information (e.g., advertisements, information, etc.) to viewers of a multimedia presentation will be considered with reference to the flowchart of FIG. 3. The method begins with a step 200 of directing the display of the multimedia presentation in a first screen segment. More particularly, for example, selected video content is displayed in a playback window 44 of the plug-in interface 42. In one contemplated embodiment, the multimedia presentation or video content is stored on the server computer system 14 as indicated above. Based on selection inputs from the user while navigating a website that links to the video content, a request is issued to the server computer system 14 to begin transferring that content to the client computer system 12 and replaying the same.

One exemplary multimedia aggregation website 55 from which desired video content can be selected for playback is shown in FIG. 4. Various content "channels" 56 are arranged in rows and columns, with each channel being depicted with a representative thumbnail image 58. Below each of the thumbnail images 58 are descriptors 60 that further indicate what the channel contains. The arrangement may be based upon parameters such as user preferences, most viewed, most popular, highest rated, and so forth. This is just one exemplary form of the website 55, however, and any suitable catalog of video content from which a selection can be made by the user to initiate its playback may be utilized.

In order to retain the unique preferences of different users, it is contemplated that the website 55 establishes user accounts. Alternatively, cookies and other technology for tracking users are contemplated. As will be described in further detail below, the various selections made by the user throughout the session with the website 55 can be tracked using browser-based cookies or other session management modalities. Referring to FIG. 5, the user may be requested to login to the account via a login page 62. The user's selected account name may be entered in an input box 64, and the user's selected password may be entered in an input box 66. After supplying the login credentials, a submission button 68 may be selected to validate the entered information and continue with the login process. If desired by the user, a selection box 69 may be activated to automatically retain the submitted login information for future use. If the user forgets the account password, a link 70 to a password recovery web page may be selected.

If the user has not yet established an account, a new one can be created via a new account page as shown in FIG. 6. The user may be requested to select a user name in input box 74. To confirm that the desired user name has not been assigned to a different account, a name validation button 76 can be selected. If, after verifying that an identical user name does not exists, some indication of the same may be displayed on the new account page 72. A desired password is entered in an input box 78, and the same password is entered again in a different input box 80 as confirmation. The user's e-mail address is entered in an input box 82, so that the user can be contacted beyond the context of the website 55. The password can be rejected if the initial entry and the confirmation do not match. Optionally and additionally, the user's zip code may be entered into an input 84 and the user's gender may be selected. In addition to these specific demographic data, others such as occupation, income level, education level, and the like may be similarly solicited. As will become apparent below, the statistics of the various users' preferences may be collected. Such statistics may be more useful if it can be segregated along more detailed demographic delineations. Additionally, such statistics may also be used for cross correlating the demographic of the user with various selections made by the user and to serve up various information or information in alternative forms (e.g., banner ads, alternative products, services, etc.) than those that the user initially selected but the user may be interested in.

The video content that is presented through the website 55 is contemplated to have certain characteristics. The website 55 is envisioned to attract users who have the intention of viewing the videos, as well as those users who desire to see certain goods and services advertised, those who wish to learn more about the video content or strategically placed in the videos, or those who wish to learn more about the video content. In this regard, the multimedia presentation is understood to include product placements for enhancing brand awareness, with the content producer being paid for incorporating the advertisement. Essentially, the advertiser subsidizes the cost of production, as it is provided to the user for free. Even in circumstances where an advertiser does not have its own goods or services placed in the multimedia presentation, the method of advertisement may nevertheless be appropriate because such goods or services may be relevant to the content and/or to the target audience.

In further detail, the video content or multimedia presentation is associated with a reference tag that is descriptive of some aspect thereof. For example, if the video content relates to and contains information about automobiles, one suitable reference tag may be "automobiles". Other reference tags are also contemplated such as auto accessories, custom wheels, repair shops, body shops, sports cars, etc. Even reference tags that are not directly related to automobiles are also contemplated, such as tags related to the driver of the automobile or the type of camera used to film the automobile. By way of example and not limitation, the multimedia presentation may include a background setting of a building or actors within the multimedia presentation may wear a particular style of clothing. Reference tags for the famous buildings and clothing articles are also contemplated. As such, multiple reference tags 98 may be associated with the video content, with each reference tag being descriptive of different aspects. The reference tags 98 may be specific as identifying a particular advertiser, a particular advertisement to which a link is provided, or any aspect of the multimedia presentation, as will be described more fully below.

Figure 7:
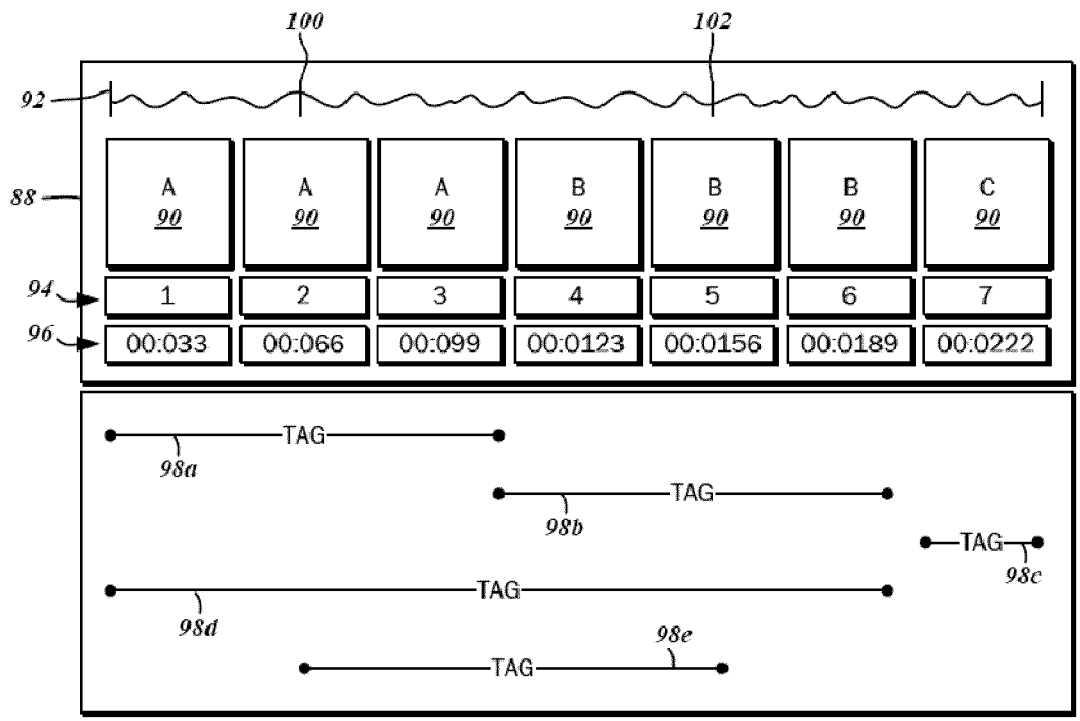
FIG. 7 is a data structure diagram of video content illustrating its constituent parts, including frames, and frame count and time code sequencing indexes, in connection with various reference tags.

FIG. 7 illustrates further exemplary details of the video content. As will be understood by those having ordinary skill in the art, a video stream 88 is a sequence of discrete images or frames 90 that are displayed at a predetermined constant rate to simulate motion. Audio data is also typically included in a separate sound channel 92. The frames 90 may be sequenced according to a frame count value 94, or to a time code value 96. The example time code values shown are based upon a frame rate of 29.97 frames per second under the National Television Systems Committee (NTSC) analog video standard, in which each frame is separated by approximately 3.3 milliseconds. The specifics of structuring, sequencing and compressing the frames 90 with respect to the video stream 88 depend on the particular coder/encoder algorithms such as MPEG-4, H.264, and so forth.

In accordance with one embodiment, reference tags 98 can be associated with one or more frames 90 of the video content. By way of example only and not of limitation, the video content relates to a first subject matter A between the first frame and the third frame, to a second subject matter between the fourth frame and the sixth frame, and to a third subject matter C during the seventh frame. The respective subject matter A, B and C of the frames 90 may relate to different aspects (e.g., product placements) included in the video content.

Continuing with this example, a first reference tag 98a may be associated with the first through third frames as depicting or otherwise being related to subject matter A. Further, a second reference tag 98b may be associated with the second through third frames as depicting or otherwise being related to subject matter B, and a third reference tag 98c that may be associated with the seventh frame as depicting or otherwise being related to subject matter C. It is possible for reference tags 98 to extend beyond (or overlap) more than one subject matter, as shown in a fourth reference tag 98d that spans the first frame to the sixth frame to encompass both subject matter A and subject matter B.

Besides visual product placement within the frames 90, it is also contemplated that reference tags are associated with other data elements (e.g., locations, production equipment used, design techniques, etc.) related to the frames. The reference tags may also be associated with various parts of the sound channel 92. As shown in the illustration of the exemplary video content, the sound channel 92 defines a segment start point 100 and a segment end point 102, to which the respective starting and ending points of the fifth reference tag 98e correspond.

Although the reference tags 98 shown in FIG. 7 extend only a few milliseconds, in practice they are understood to span much greater periods of time. The short time spans are presented only for the sake of explaining the concept of the reference tags 98 being associated with different subsets of the frames 90.

The reference tags 98 are applied to the video content based upon an automated identification and a manual identification of pertinent subject matter and points of interest prior to becoming available for retrieval on the website 55. This is intended to reduce or altogether eliminate any semantic gaps associated with the translating between human-driven natural language and its computational representation in low-level, formal programming languages. A greater degree of semantic relevancy and cohesion may thus be achieved. It is also contemplated that users may apply the reference tags 98 to video content. By way of example and not limitation, a company upon seeing their product displayed in a video may apply reference tags 98 which may be open to peer review or review by a third party for accuracy.

Figure 8:
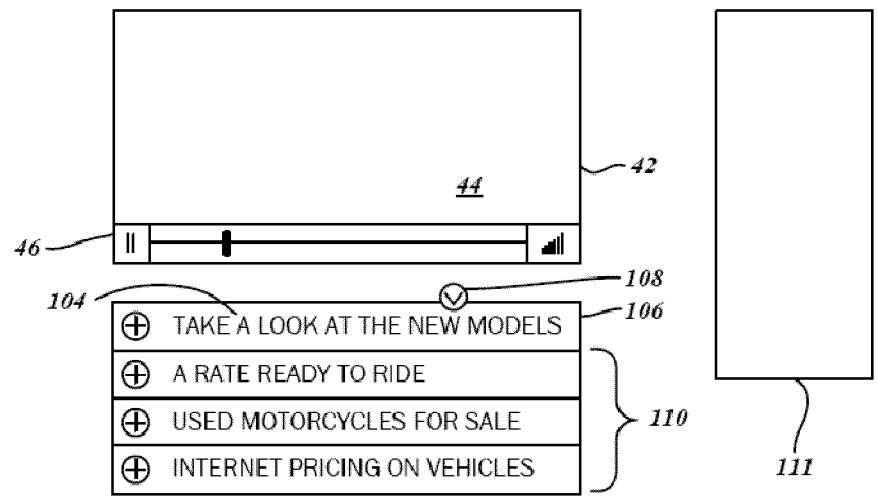
FIG. 8 is a detailed illustration of the plug-in interface and the information display unit.

Referring again to the flowchart of FIG. 3, the method of serving information (e.g., advertisement) continues with a step 202 of generating an advertising or informational link in a second screen segment. The term "advertising" as referenced in connection with various generated links and the like is understood to be specific to those embodiments where advertising is provided. It is contemplated, however, that any other type of information besides advertisements such as educational information or any other related information can be delivered in accordance with the various embodiments of the present disclosure, and accordingly, "advertising" is not intended to be limiting. In this regard, the advertising link may be referred to more generally as an information link. FIG. 8 specifically shows a link 104 that is generated within an information display unit 106. As indicated above, the first screen segment, within which the multimedia presentation is displayed, refers to the plug-in interface 42. Along these lines, the second screen segment, within which the link 104 is generated, refers to the information display unit 106. According to one embodiment, the first screen segment is different from the second screen segment, that is, the link 104 is displayed apart from the video content so that the user may continue viewing the multimedia presentation thus mitigating interruption or distraction. It is also contemplated that the first and second screen segments may be merged into one screen segment. In this situation, the upper part of the one screen segment will display the information contained in the first screen segment and the lower part of the one screen segment will display the information displayed in the second screen segment, or vice versa. The information display unit 106 displayed in the one screen segment may be expanded or minimized by the user.

The advertising or information link 104 is contextually related to the video content in accordance with the reference tag 98. More particularly, the advertising or information link 104 indicates that an opportunity exists to obtain further information about goods, services or information associated therewith. That is, a selection of the generated advertising or information link 104 is an indication that the user is interested in the subject matter identified by the corresponding reference tag 98. As mentioned above, the reference tag 98 may identify broadly an entire class of related goods or services, a series of advertisements from a specific advertiser, or a specific advertisement. Therefore, the advertising link 104 can be as narrow or as broad as defined by its corresponding reference tag 98.

Any number of reference tags 98 may be associated with the video content, and so may be a corresponding number of advertising and/or information links 104 that can be shown in the information display unit 106. It is contemplated that one or more advertising or information links 104 can be displayed at any given point in time. A variety of graphic effects are contemplated for transitioning from displaying one link 104 to another, such as, for example, a scrolling "ticker" effect. Because the tolerance for distractions differs from person to person, the number of links simultaneously displayed in the information display unit 106 may be adjustable based on user preference.

As best illustrated in FIG. 8, although the other links 104 are otherwise obscured, selecting a "view all" button 108 loads all of the associated links 104 into a supplemental display portion 110. The links 104 can be organized in a variety of ways, including by category, by user preference, and the like.

One particular embodiment contemplates that the inks 104 are generated in the information display unit 106 in synchronization with the presentation of the video content. It was previously noted that different reference tags 98 could be associated with various subsections of the video content as being contextually related to subject matter (e.g., audio, songs, etc.) or product placements shown therein. When the playback reaches the subsection of the video content to which a given reference tag 98 was associated, then its corresponding link 104 is displayed in the information display unit 106.

Continuing with the example set forth in FIG. 8, while a certain sequence of frames 90 of a particular scene of the video content is being shown, an automobile may be introduced. Prior to this, the more generally applicable links 104 described above may be shown. Thereafter, the link may show something to the effect of, for example, "Take a look at the new 2009 models." In order to distinguish these particular links 104, visual embellishments may be added. Additionally, the links 104 being shown may be based on the various other links 104 that the user has previously clicked on. Also, the links 104 being shown may be cross correlated with prior clicked or selected links 104 as well as the demographic of the user and the expected interest of the user based on prior study.

Although advantageous from an implementation perspective, it is not necessary for the information display unit 106 to be integrated with the video playback plug-in. To enable the playback synchronization feature, the frame count value 94 or the time code value 96 from the plug-in is accessed by the information display unit 106 via an application programming interface. Those having ordinary skill in the art will be able to readily ascertain the specific implementation details of handling media-embedded or separately stored and linked reference tags 98 in relation to this embodiment.

With reference again to the flowchart of FIG. 3, the method continues with a step 204 of receiving a selection input of the currently displayed link 104 from the user. In the context of the website 55, this is understood to refer to "clicking" the link 104. For other embodiments that utilize other input and output modalities, it will be understood that the user's selection action has corresponding counterparts. According to various embodiments, the information display unit 106 and the links 104 generated therein are to be as minimally intrusive as possible to avoid interrupting the user's attention to the video content being presented in the playback window 44. As such, the receipt of the selection input is understood to occur while the presentation is ongoing. Additionally, the second segment may be restored in FIGS. 2 and 8 or minimized if the user does not want to see a scrolling set of information links 104. The end-user may dictate the viewing experience.

After receiving the selection input, the method continues with a step 206 of associating the selected link 104 to an identity of the user as a marker. As will be described in further detail below, these markers can be subsequently accessed for review at the user's convenience, perhaps after the presentation has concluded.

If the user so desires, however, immediately after the marker is associated in memory, a web page or other network resource may be requested so data can be retrieved and rendered in the browser window 40 according to step 208. The web page or other network resource may show a listing of markers. The markers may be stored in a database on the server computer system 14 or the client computer system 12 in a database as a persistent storage or temporary storage. In a similar but different embodiment, a banner advertisement 111 that is distinct from the information display unit 106 may be rendered in the browser window 40. The banner advertisement 111 may be the particular advertisement that is selected via the link 104, or an advertisement that is related thereto. Further, multiple related advertisements may be cycled through the banner advertisement 111. Other resident software applications and basic computing functions may be invoked via the link 104 as well. For example, a music jukebox application may be started with an initial query to retrieve a song associated with the link 104, to give the user the opportunity to purchase the same. Furthermore, other functions of the video playback plug-in, such as loading a different video into a playlist queue may also be invoked. Generally, the associated function of the link 104 is determined by how the advertiser desires to best utilize it to execute an advertising strategy. Before proceeding along these lines, the multimedia presentation may be paused, that is, an instruction to pause the presentation may be issued to the application programming interface of the video playback plug-in.

Alternatively, after the marker is associated, it may then be stored into a database according to step 210 of one embodiment contemplated in the present disclosure. As discussed above, the database may be stored in the server computer system 14 or the client computer system 12 as a persistent storage or temporary storage. If the user has established an account on the website 55 as described above, the marker may be stored in a record of the database that is specifically linked to the account, and may be retrieved at any time. The database may be as simple as a flat text file on the server computer system 14, or as complex as a relational database system. Those having ordinary skill in the art will be able to select an appropriate database based upon the anticipated number of users, traffic volume, and so forth.

If the user has not established an account, however, the marker may be stored in a temporary session cache of the web browser application. All stored data in the session cache may be retained until the browser session is closed and the data is removed. Typically, though not necessarily, session data is cleared once the browser application is closed. Before concluding the session, the user may be directed to the new account page shown in FIG. 6 to establish a new account and store the markers from the current session.

Optionally, the method continues with a step 212 of retrieving the markers associated with the identity of the user in response to a follow-up input from the same. With reference to the example screen capture of FIG. 9, the input may be operative to load a marker collection page 112 that lists the markers from the current session or retrieved from the database stored on the server computer system 14. The marker collection page may be rendered on a third screen segment that is apart or entirely different from the first screen segment or the second screen segment. Alternatively, the marker collection page may be a part of the one segment discussed above which displays the information of the first and second screen segments.

Although any suitable layout may be used, the illustrated example is an enumerated list with each record or row including a thumbnail image 114 that provides a visual preview of the contents or subject matter of the marker. This is followed by a hyperlinked text description 116 of the marker, which is understood to be a hyperlink to the advertisement or other content that is the subject of the marker. In one embodiment, the method continues with the step 208 of retrieving the referenced web page or other network resource discussed above. For example, a first listed marker 118 is for a "Fossil" brand dress watch. The hyperlinked description 116 thereof may be to the company site where features of the watch are described and additional images of the same are provided. As another example, a second listed marker 120 is for the Season 4 of the "House M.D." television show. The hyperlinked description 116 of this marker may be to a television network site where episodes may be viewed, or further information about the show, its characters and its cast may be retrieved.

Other elements of the marker collection page 112 include an "other related items" link 122 for the corresponding marker, a "remove" link 124, and a "shop now" link 126. It is understood that the "other related items" link 122 retrieves other information that is related to the marker and/or cross correlated to the user. According to one embodiment, the corresponding reference tag 98 of the listed marker may be utilized to search for other links 104 with the same reference tag 98. The "remove" link 124 removes the marker from database, and the "shop now" link 126 loads an e-commerce site where the good or service that is the subject of the marker can be purchased. Again, there are numerous other features such as sharing with social networking systems that can be incorporated into the marker collection page 112, and the foregoing has been presented by way of example only and not of limitation. Along these lines, based on the example-based description of the marker, it will be appreciated that there are many possible uses therefor, all of which are within the scope of the present disclosure.

One embodiment of the method for advertisement has been discussed in relation to the website 55, from which multimedia content can be retrieved and viewed. It is expressly contemplated that the method is equally appropriate for other application settings, and such other uses are also deemed to be within the scope of the present disclosure. For example, video content may be embedded into e-mails such as newsletters and entertainment content subscriptions. Essentially, in this case, a link to the information display unit 106 is included in the body of the e-mail, and utilizing a suitable plug-in for the e-mail application, the video content is shown. Additionally, implementation of the method in kiosks, mobile phones, and so forth, is also envisioned, with information particular to the installation locale being provided to the user.

Figures 9, 10:
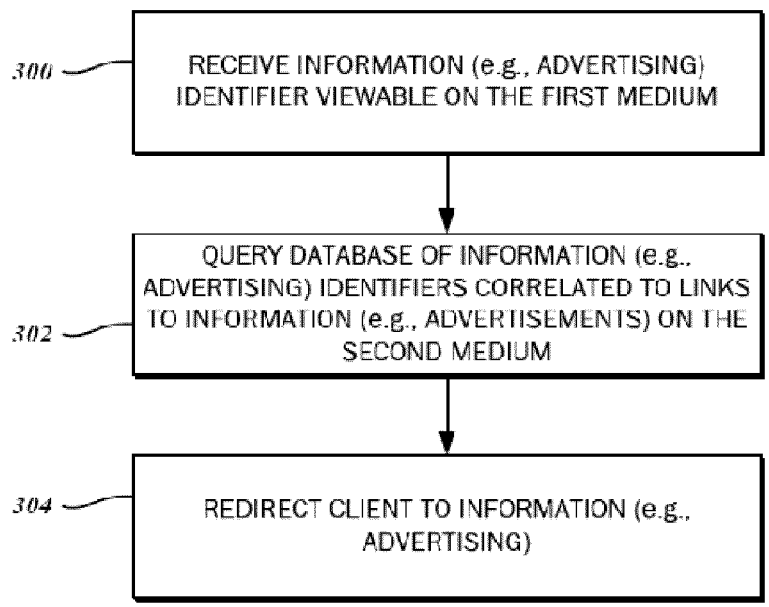
FIG. 9 is a marker collection page in accordance with one embodiment of the present disclosure.
FIG. 10 is a flowchart of the steps in a method for bridging information from a first medium to a second medium.
Figure 11:
FIG. 11 is an example magazine cover on which an information identifier utilized in the method for bridging information is printed.

With reference to the flowchart of FIG. 10 and the printed matter of FIG. 11, another embodiment contemplates a method for bridging advertising communications from a first medium to a second medium. The method begins with a step 300 of receiving an advertisement or information identifier 128 that is viewable on the first medium, which is, by way of example, a cover 127 of a magazine entitled "Republic of Fashion."

Numerous application settings are envisioned for the method, and so there are many media in which the advertisement or information identifier 128 can be placed. One exemplary setting is an art gallery, where the advertising or information identifier is placed on the frame of the painting. Another exemplary setting is a billboard or other large format public-space advertising for various products, services, movies, and the like. As apparent from the exemplary first medium above, smaller advertising media are also contemplated, in which the identifier 128 is placed on magazine covers, articles, and advertisements, as well as newspapers and other such printed media.

In the exemplary embodiment, the second medium is understood to be a webpage or other digital content that can be employed to expand upon the limited information provided in the first medium.

Figure 12:
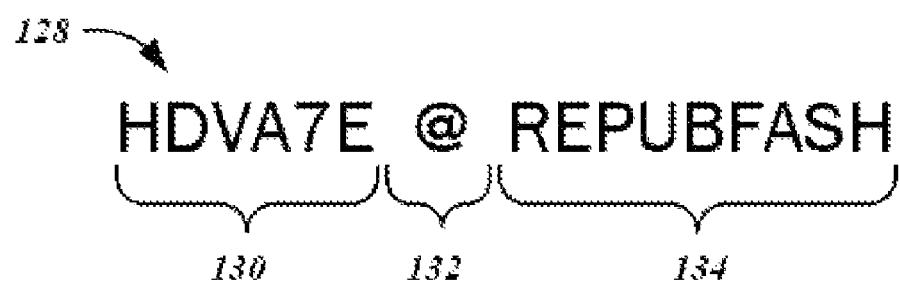
FIG. 12 is a diagram showing the components of the information identifier including a first relational element, a separator, and a second relational element.

FIG. 12 shows an exemplary identifier 128 including a first relational element 130, a separator 132, and a second relational element 134. Each of the characters of the identifier 128 are alphanumeric and symbols that are readily comprehended by human readers. The identifier 128 is understood to create an association between the first medium and the second medium. Specifically, the first relational element 130 and the second relational element 134 both refer to a set of data elements. The first relational element 130, i.e., the hexadecimal character string H4DA7E, is the reference to a relational set of information elements displayed on the magazine cover 127. Additionally, the first relational element 130 includes similar information elements that may not necessarily appear on the magazine cover 127 but are relevant to the information categories that are present. The second relational element 134, i.e., REPUBFASH, is the reference to another relational set of data elements. This might include information regarding the publisher, the associated website, and the periodical issue such as month and/or year of publication, International Standard Book Number (ISBN) and so forth. The structure of the identifier 128 differs from one industry to another, in that identifiers for clothing may have different elements than those for automotive information, for example.

Following a deconstruction of the identifier 128 into its constituent parts as set forth above, the method continues with a step 302 of querying a database of identifiers correlated to advertisements or information on the second medium. The database may be queried via a desktop computer, laptop computer, a mobile phone, etc. The database is queried for the received first relational element 130 and the second relational element 134. Thereafter, in step 304, the client may be redirected to the particular advertisement corresponding to the first relational element 130 and the second relational element 134. Redirecting the client to the particular advertisement is understood to include displaying one or more links related to the identifiers 128 in the manner described above, associating a selected one of the links to a user identity as a marker as clicked by the user. Additionally, the client may be immediately shown the particular advertisement by itself, or embedded within other content such as in a banner advertisement. In general, this step is understood to include any operations that lead to a particular advertisement or information being shown to the client. Thus, the various items and data elements that the model on the magazine cover 127 are showcased in the advertisements.

Having described the technical details of the method for bridging advertisements and the identifier 128, a more general description of the uses thereof in the context of the aforementioned scenarios will now be considered. In the art gallery example, the code from the frame of a painting may be entered into a web browser or phone application to discover more about the artist, other works by the artist, and any similar artists. In the advertisement example, submitting the advertisement identifier 128 will generate a query for any additional information regarding the product being advertised or otherwise presented. That is, a product advertisement may not only include a single product being advertised, but also peripheral elements as well. For example, in the context of an automobile advertisement, the primary focus of the advertisement may be the automobile, but there may also be a driver wearing a particular outfit. It is also possible to link to information regarding such an outfit worn by the model as well. Additionally, products related to the one that is the subject of the advertisement may also be shown, along with pertinent promotions, sales, and so forth that may be approaching. The identifier 128 is not limited to specific product advertisements, however, and it can be incorporated into various newspaper and magazine articles in order to link to resources relating to the author or key elements discussed. An identifier 128 may even be assignable to the periodical itself, with links to subscription inquiries, locations of purchase, and so forth.

It will be recognized from the numerous examples above that the method can be adapted to any situation that can benefit from a fast and easy link to additional relevant information; with one of the needs for such a method being the extreme length and cryptic nature that URLs can reach in order to achieve the same direct connection to information, thus making them unwieldy for users to remember and utilize as well as impractical when space is limited. For instance, here is an Amazon.com link that connects directly to an Apple product: "http://www.amazon.com/Apple-Mac-mini-MC239LL-Desktop/dp/B002QQ8CC4/ref=sr_1_5?ie=UTF8&s=pc&qid=1256699707&sr=1-5". And this one is fairly short. The method presumes that most people would not even try to remember this URL string. For the reason just illustrated, most magazines and other media presentations only send viewers to the homepage (e.g., www.amazon.com), which makes the reader or viewer have to rely on clunky website navigation keywords typed into a website's built in search engine, most of which are not very good if they even have a search mechanism at all. The method can be implemented in any data processing system capable of performing it, including desktop computers, laptop computers, and cellular phones. Given the foregoing description of the method, one of ordinary skill in the art will be more than capable of developing software for these platforms that implement the method.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for delivering information to a viewer of a media presentation, the method comprising the steps of:
    engaging a media presentation;
    viewing one or more information links associated with the media presentation while the media presentation is ongoing;
    selecting one or more of the information links while mitigating obstruction of the media presentation;
    storing the selected link as a marker in memory for retrieval; and
    viewing one or more markers on a marker collection page.

2. The method of claim 1 further comprising the step of viewing the marker collection page after the engaging the media presentation step.

3. The method of claim 1 wherein the engaging step comprises the step of engaging the media presentation within a first segment on a screen and the viewing information link step comprises the step of viewing the information links within a second segment of the screen.

4. The method of claim 1 wherein a portion of the media presentation has a reference tag descriptive of an aspect of the media presentation and the information link corresponds to the reference tag, the information link being contextually related to the media presentation.

5. The method of claim 3 wherein the media presentation includes video defined by a plurality of sequenced images, the reference tag being associated with a particular subset of the sequenced images.

6. The method of claim 5 wherein the information link is viewed in the second screen segment in synchrony with the displaying of the particular subset of the sequenced images.

7. The method of claim 5, wherein a media player application displays the media presentation, the method further including the step of:
    receiving a sequence identifier of a current one of the plurality of sequenced images being displayed.

8. The method of claim 5, wherein:
    the particular subset of the sequenced images includes data including metadata; and
    the information link is associated with the data including the metadata.

9. The method of claim 5, wherein the media presentation includes an audio sequence, the reference tag being associated therewith.

10. The method of claim 9, wherein:
    the audio sequence is a background musical soundtrack; and
    the information link is associated with the background musical soundtrack.

11. The method of claim 9, wherein:
    the audio sequence is an audible emphasis; and
    the information link is associated with a subject matter of the audible emphasis.

12. The method of claim 3, wherein the second screen segment is different from the first screen segment.

13. The method of claim 3, wherein the first screen segment and the second screen segment are parts of a web page.

14. The method of claim 1, further, comprising:
    viewing advertisement associated with the information link in response to a follow-up input from the one of the viewers.

15. The method of claim 1, further comprising:
    storing the marker into a database.

16. The method of claim 15, wherein:

the database includes one or more user accounts; and the first marker is associated with a user account corresponding to the identity of the one of the viewers.

17. The method of claim 15, wherein the database is a temporary browser session cache or a memory storage location.

* * * * *